United States Patent
Bihlmeyer et al.

(10) Patent No.: US 6,785,811 B1
(45) Date of Patent: Aug. 31, 2004

(54) METHODS, SYSTEMS AND COMPUTER PROGRAM PRODUCTS FOR PROVIDING MULTIPLE CRYPTOGRAPHIC FUNCTIONS TO APPLICATIONS USING A COMMON LIBRARY

(75) Inventors: John Charles Bihlmeyer, Wake Forest, NC (US); Mark Charles Davis, Durham, NC (US); John Michael Garrison, Austin, TX (US); David Gerard Kuehr-McLaren, Apex, NC (US); Reid L. Sayre, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/533,140

(22) Filed: Mar. 23, 2000

(51) Int. Cl.[7] .............................. H04L 9/00; H04K 1/00
(52) U.S. Cl. .......................... 713/167; 380/28; 380/255
(58) Field of Search ........................... 713/167; 380/255

(56) References Cited

U.S. PATENT DOCUMENTS 5,073,934 A * 12/1991 Matyas et al. ................ 380/30
5,689,565 A * 11/1997 Spies et al. .................. 713/189
5,933,503 A * 8/1999 Schell et al. ................ 713/189
6,148,083 A * 11/2000 Fieres et al. ................ 380/255
6,317,849 B1 * 11/2001 Patel ........................... 711/103
6,335,972 B1 * 1/2002 Chandersekaran et al. .. 380/286

OTHER PUBLICATIONS

IBM Technical Disclosure Bulletin, Flexible Interface for Adding/Changing, Jan. 1, 1998, pp. 709–710, NN9801709.*

* cited by examiner

Primary Examiner—Gregory Morse
Assistant Examiner—Jacob Lipman
(74) Attorney, Agent, or Firm—Myers Bigel Sibley & Sajovec, P.A.; Jeanine S. Ray-Yarletts (57) ABSTRACT

Methods, systems and computer program products are provided which provide cryptographic services to an application by incorporating in the application an indication of at least one authorized cryptographic function for the application. The indication of at least one authorized cryptographic function for the application is communicated to a cryptographic library that supports a plurality of cryptographic functions. The at least one authorized cryptographic function corresponding to the indication of at least one authorized cryptographic function is then identified as a valid cryptographic function for the application.

63 Claims, 6 Drawing Sheets

METHODS, SYSTEMS AND COMPUTER PROGRAM PRODUCTS FOR PROVIDING MULTIPLE CRYPTOGRAPHIC FUNCTIONS TO APPLICATIONS USING A COMMON LIBRARY

FIELD OF THE INVENTION

The present invention relates to cryptographic functions and more particularly relates to how cryptographic functions are provided to applications.

BACKGROUND OF THE INVENTION

Increasingly, computer applications utilize secure communications when communicating with other applications, for example, over an intranet or the Internet. One example of such a secure communication methodology is the Secure Socket Layer (SSL) provided by the Transport Control Protocol/Internet Protocol (TCP/IP). SSL provides for differing levels of encryption. For example, applications using the SSL to communicate may use 56 bit or 128 bit encryption.

Generally, applications utilize a common library which provides the encryption functions used by the application. Thus, for example, a library may provide 56 bit SSL encryption. Typically, this library is utilized by all applications on a processing system for encryption. If a user desires to change the level of encryption then, typically, the user would replace the 56 bit SSL encryption library with a different library, For example, a user may utilize the S-Channel library provided by Microsoft Corporation, Redmond, Wash. to provide increased encryption levels by replacing the existing encryption library with the S-Channel library. After such a replacement, typically, all applications utilizing the SSL for communications would utilize this new library. Thus, the cryptographic level of applications for the processing system will be the highest level of any application on the processing system.

One problem with such a global replacement mechanism relates to United States Government regulations on the export of cryptographic technology. Such regulations control the level of cryptography which may be exported outside the United States or Canada depending on the type of application utilizing the technology. Thus, the conventional technique of utilizing a single library to provide cryptographic functions may be unsuitable for applications which may be exported outside the United States as not all applications will be allowed to utilize the same level as other applications.

One potential method for allowing variations in the cryptographic level for different applications would be to build the cryptographic functions into each application. However, such a system may be costly and require different versions of applications which may result in, for example, increased burdens in service and support. Furthermore, development of applications may become more expensive as each application would need to develop its own cryptographic functions.

Accordingly, a need exists for improvements in how cryptographic functions are provided for applications.

SUMMARY OF THE INVENTION

Embodiments of the present invention include methods, systems and computer program products which provide cryptographic services to an application by incorporating in the application an indication of at least one authorized cryptographic function for the application. The indication of at least one authorized cryptographic function for the application is communicated to a cryptographic library capable of supporting a plurality of cryptographic functions. That at least one authorized cryptographic function corresponding to the indication of at least one authorized cryptographic function is then identified as a valid cryptographic function for the application.

In particular embodiments of the present invention, communication of the indication of at least one authorized cryptographic function is accomplished by identifying a location associated with the indication of the at least one authorized cryptographic function to the cryptographic library capable of supporting a plurality of cryptographic functions. The application is called from the library at the identified location utilizing a predefined query format to request notification of cryptographic functions for which the application is authorized. The indication of the at least one authorized cryptographic function is provided from the application to the library utilizing a predefined format in response to the query.

In still further embodiments of the present invention, it is determined if the call from the library to the application is in a format other than the predefined query format. The call is rejected if the call is in a format other than the predefined query format.

In yet other embodiments of the present invention, the call of the application from the library is carried out in a manner which obscures the contents of the call. In particular embodiments, the contents of the call are obscured by calling the application from the library utilizing a void pointer data type for parameters passed to the application. Furthermore, the indication of at least one authorized cryptographic function may also be carried out utilizing a void pointer data type for parameters passed to the library. In further embodiments of the present invention, the application and the library utilize the same predefined data format for sending and receiving parameters defined as a void pointer data type.

In other embodiments of the present invention, the indication of at least one authorized cryptographic function is provided by statically defining the indication in the application when the application is compiled.

In yet other embodiments of the present invention, a process is associated with the application. In such a case, the at least one authorized cryptographic function is identified as a valid cryptographic function for the cryptographic functions requested by all services within a scope associated with the process. In particular embodiments, a location associated with the indication of at least one authorized cryptographic function is identified to the cryptographic library by setting a pointer in a globally accessible memory location associated with the process to point to the location.

In additional embodiments of the present invention, methods, systems and computer program products are provided which may provide a plurality of cryptographic functions utilizing a common library by receiving at the common library a request from an application for a cryptographic function. A predefined global variable is inspected to determine a location to query the application to ascertain authorized cryptographic functions for the application. The determined location is queried utilizing a predefined query format and an identification of authorized cryptographic functions for the application is received. The identification is provided in a predefined identification format.

In additional embodiments of the present invention the query of the determined location is performed in a manner which obscures the predefined query format. For example, the query of the determined location may be performed utilizing pass parameters which have a void pointer data type. Furthermore, the receipt of the identification may also be performed in a manner which obscures the predefined identification format. For example, the receipt of the identification may be performed utilizing pass parameters which have a void pointer data type.

In still further embodiments of the present invention, the identified authorized cryptographic functions are utilized for all services requesting a cryptographic function which are within a scope of a process associated with the application.

In yet other embodiments of the present invention, methods, systems and computer program products are provided which may provide a plurality of cryptographic functions utilizing a common library by statically defining authorized cryptographic functions for an application. A location, associated with the application, for receiving queries for identification of the authorized cryptographic functions for the application is also defined. The location associated with the application is registered with the common library. A query is received at the registered location. The query is in a predefined query format. An identification of the authorized cryptographic functions for the application is provided in response to the query, where the identification is provided in a predefined identification format.

In particular embodiments, the query is received at the registered location in a manner which obscures the predefined query format. For example, the query may be received utilizing pass parameters which have a void pointer data type. Furthermore, the identification may be provided in a manner which obscures the predefined identification format. For example, the identification may be provided utilizing pass parameters which have a void pointer data type.

In further embodiments of the present invention, the identified authorized cryptographic functions are utilized for all services requesting a cryptographic function which are within a scope of a process associated with the application.

While the invention has been described above primarily with respect to the method aspects of the invention, both systems and/or computer program products are also provided.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language. The program code may execute entirely on the user's computer, partly on the user's computer, as a standalone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to an embodiment of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, the present invention provides multiple cryptographic functions, such as multiple levels of cryptography, utilizing a common library. According to some embodiments of the present invention, applications statically define those cryptographic functions for which they are authorized. This identification is then requested by and provided to a library of cryptographic functions utilizing a secure interface. Such a secure interface may be an arbitrary data format which is predefined for both the application and the library and then maintained in confidence. Any data format may be utilized as long as both the application and the library utilize the same format and the format is maintained in confidence. Alternatively, if a publicly known format is utilized, then the communications between the application and the library may be encrypted, signed or otherwise made secure. Various embodiments of the present invention will now be described with reference to FIGS. 1 through 6.

Figure 1:
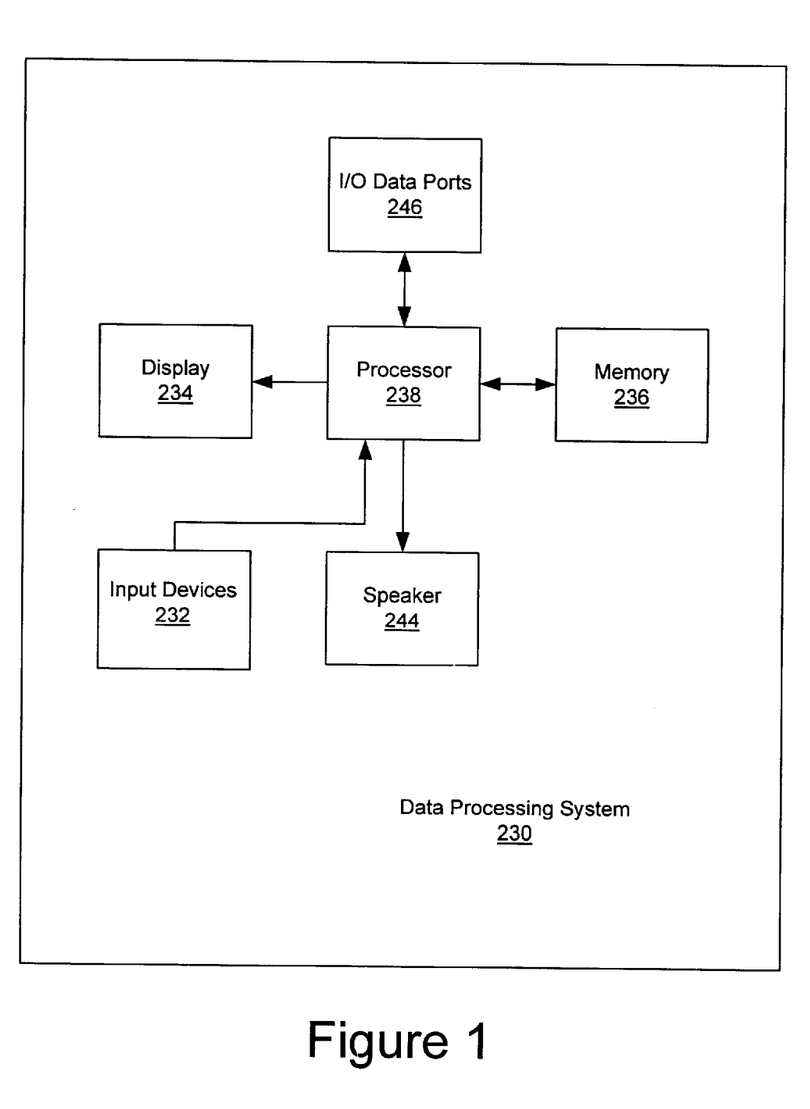
FIG. 1 is a block diagram of data processing system according to embodiments of the present invention.

Referring now to FIG. 1, an exemplary embodiment of a data processing system 230 in accordance with embodiments of the present invention typically includes input device(s) 232 such as a keyboard or keypad, a display 234, and a memory 236 that communicate with a processor 238. The data processing system 230 may further include a speaker 244, and an I/O data port(s) 246 that also communicate with the processor 238. The I/O data port 246 can be used to transfer information between the data processing system 230 and another computer system or a network (e.g., the Internet). These components may be conventional components such as those used in many conventional pervasive computing devices which may be configured to operate as described herein.

Figure 2:
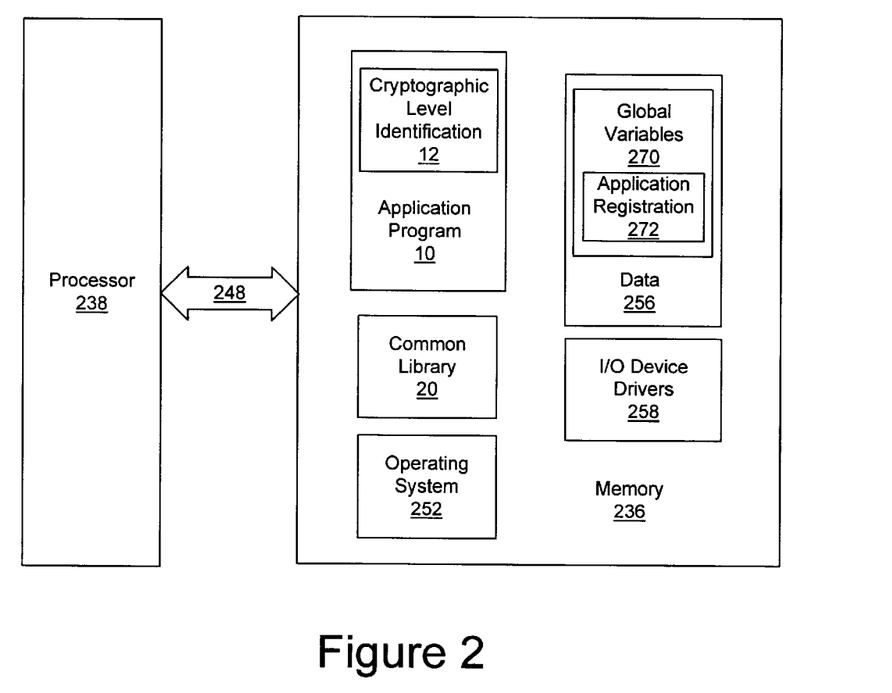
FIG. 2 is a more detailed block diagram of data processing systems according to embodiments of the present invention.

FIG. 2 is a block diagram of embodiments of data processing systems that illustrates systems, methods, and computer program products in accordance with the present invention. The processor 238 communicates with the memory 236 via an address/data bus 248. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash, SRAM, and DRAM.

As shown in FIG. 2, the memory 236 several categories of software and data used in the data processing system 230: the operating system 252; the application program 10; the common cryptographic library 20; the input/output (I/O) device drivers 258; and the data 256. As will be appreciated by those of skill in the art, the operating system 252 may be any operating system suitable for use with a data processing system, such as OS/2, AIX or System390 from International Business Machines Corporation, Armonk, NY, Windows95, Windows98 or Windows2000 from Microsoft Corporation, Redmond, Wash., Unix or Linux. The I/O device drivers 258 typically include software routines accessed through the operating system 252 by the application program 10 to communicate with devices such as the input devices 232, the display 234, the speaker 244, the I/O data port(s) 246, and certain memory 236 components. The application program 10 is illustrative of the programs that implement the various features of the data processing system 230 and represents any application which may utilize cryptographic functions. And, finally, the data 256 represents the static and dynamic data used by the application program 10, the common cryptographic library 20, operating system 252, I/O device drivers 258, and any other software program that may reside in the memory 236.

As is further seen in FIG. 2, the application program 10 preferably include a cryptographic level identification function 12 which identifies the cryptographic functions within the common library 20 which are authorized for the application 10. Furthermore, the data portion of memory 236 preferably includes global variables 270 which are associated with the application program 10 and which are accessible to the common library 20. The global variables 270 also preferably include an application registration variable 272 which may be set by the application program 10 and which identifies a location where the cryptographic level identification function 12 may be accessed. While the present invention is illustrated, for example, with reference to a separate common cryptographic library 20, as will be appreciated by those of skill in the art, the cryptographic functions may also be incorporated into the operating system 252. Thus, the present invention should not be construed as limited to the configuration of FIG. 2 but is intended to encompass any configuration capable of carrying out the operations described herein.

Figure 3:
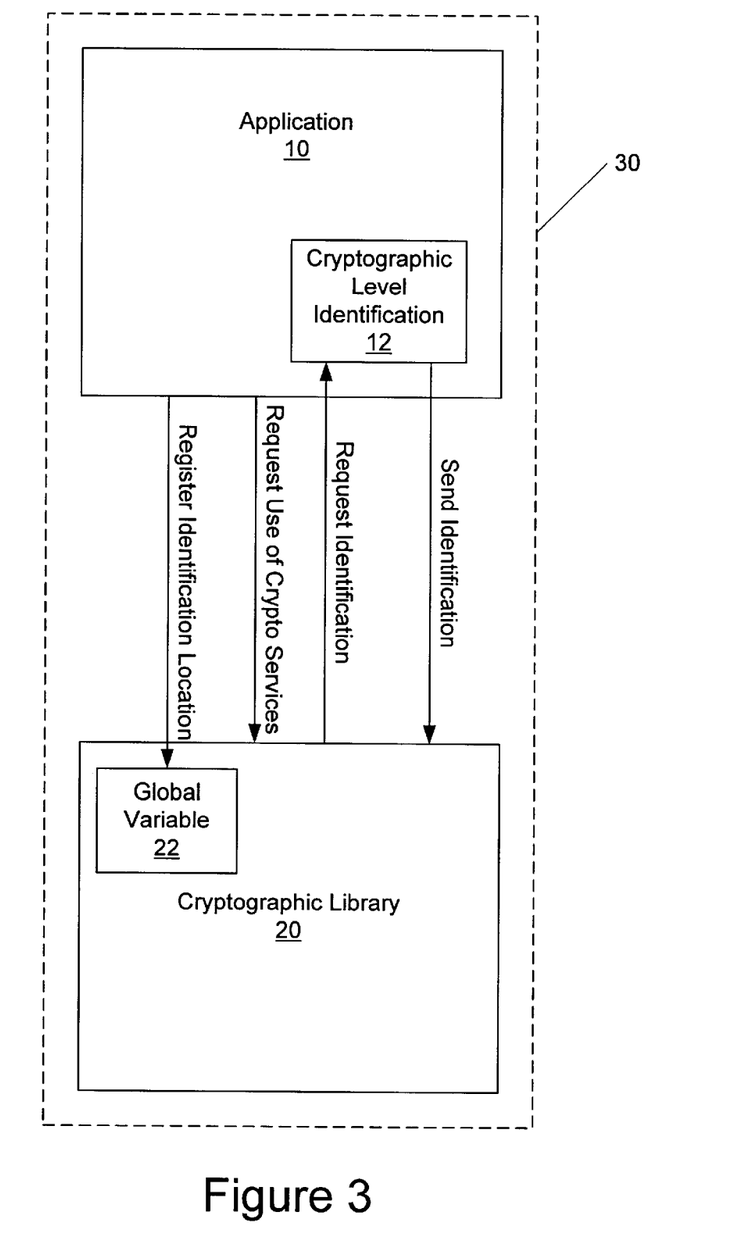
FIG. 3 is a block diagram illustrating the relationship between an application and a common library according to embodiments of the present invention.

FIG. 3 illustrates the interaction between an application program 10 and a common library 20 in FIG. 2 which provides a plurality of cryptographic functions, such as a library which provides Secure Socket Layer (SSL) functions, according to embodiments of the present invention. As seen in FIG. 3, the application 10 has incorporated into it a cryptographic level identification function 12 which identifies the cryptographic levels which are authorized for the application. Preferably, the authorized cryptographic levels are statically identified at compile time for the application such that they are not accessible to being modified by users of the application but are predefined. It is also preferred that the identification be carried out in a manner such that decompiling the application will not readily allow for altering the authorized cryptographic levels. For example, the cryptographic levels authorized for the application 10 may be established so as to comply with United States Government export regulations for applications enabled for cryptography. In such a case it is desirable that the authorized levels not be readily alterable so as to assure compliance with the export regulations.

As is further seen in FIG. 3, when the application 10 is instantiated, it has associated with it a process 30 which defines the scope of the application space. Within that application space, there will typically be created an area for global variables, e.g. variables which are accessible to all objects, services, applications, etc. which are executing in the process 30. According to particular embodiments of the present invention, a registration global variable 22 is defined which is associated with the cryptographic library 20.

As is further seen in FIG. 3, the application 10 registers with the cryptographic library 20 by setting the registration global variable 22 to specify a location which the cryptographic library 20 may utilize to access the cryptographic level identification function 12 to obtain the cryptographic levels for which the application 10 is authorized. When the application 10 accesses the cryptographic library 20 to use the cryptographic services, the cryptographic library 20 queries the cryptographic level identification function 12 at the location specified by the registration global variable 22. If no location is specified, for example, by the application 10 not being registered, then the cryptographic library 20 may use a default cryptographic level. Thus, if the library 20 provides SSL functions, then 56 bit encryption may be provided as a default if the application 10 is not registered.

The query from the cryptographic library 20 to the application 10 preferably is of a predefined query format which is known to both the cryptographic library 20 and the application 10 and which is maintained in confidence. The actual format utilized may vary and may depend on the particular data processing system or operation system on which the present invention is implemented. However, in general, any predefined format may be utilized as long as it is maintained in confidence.

In response to the query from the cryptographic library 20, the application 10 provides an identification of the cryptographic levels which are authorized for the application 10. The cryptographic library 20 may then utilize the cryptographic levels authorized for the application 10 in, for example, establishing a secure connection with another data processing system over a network. Again, if the cryptographic library provides SSL functions, then the application 10 may identify those cryptographic levels for which it is authorized and the cryptographic library 20 may utilize those cryptographic levels in negotiating an SSL connection over a network.

The identification of the authorized cryptographic levels preferably is of a predefined identification format which is known to both the cryptographic library 20 and the application 10 and which is maintained in confidence. The actual format utilized may vary and may depend on the particular data processing system or operation system on which the present invention is implemented. However, in general, any predefined format may be utilized as long as it is maintained in confidence.

The query of the cryptographic level identification function 12 and the response to the query which provides the identification of the authorized cryptographic levels for the application 10 are preferably performed in a manner which obscures the nature of the interface between the application 10 and the cryptographic library 20. For example, in embodiments of the present invention which are implemented in the C programming language, the parameters of the query and the identification may be defined as having void pointer data type. Such a data S type does not provide information on how the data is formatted. Thus, the parameters may be passed as void pointers and the application 10 and the cryptographic library 20 may format the data using the predefined formats. Without knowing the predefined formats the content of the passed parameters may be difficult to ascertain. The use of the void pointer data type obscures the format of the data and, thereby, obscures the interface between the application 10 and the cryptographic library 20. Thus, it may be difficult for a user to manipulate the data between the application 10 and the cryptographic library 20 to alter the cryptographic levels which may be utilized with the application 10. Data types for other programming languages which obscure the format of the data are known to those of skill in the art and may be utilized if the application or library is written in a language other than C.

Figure 4:
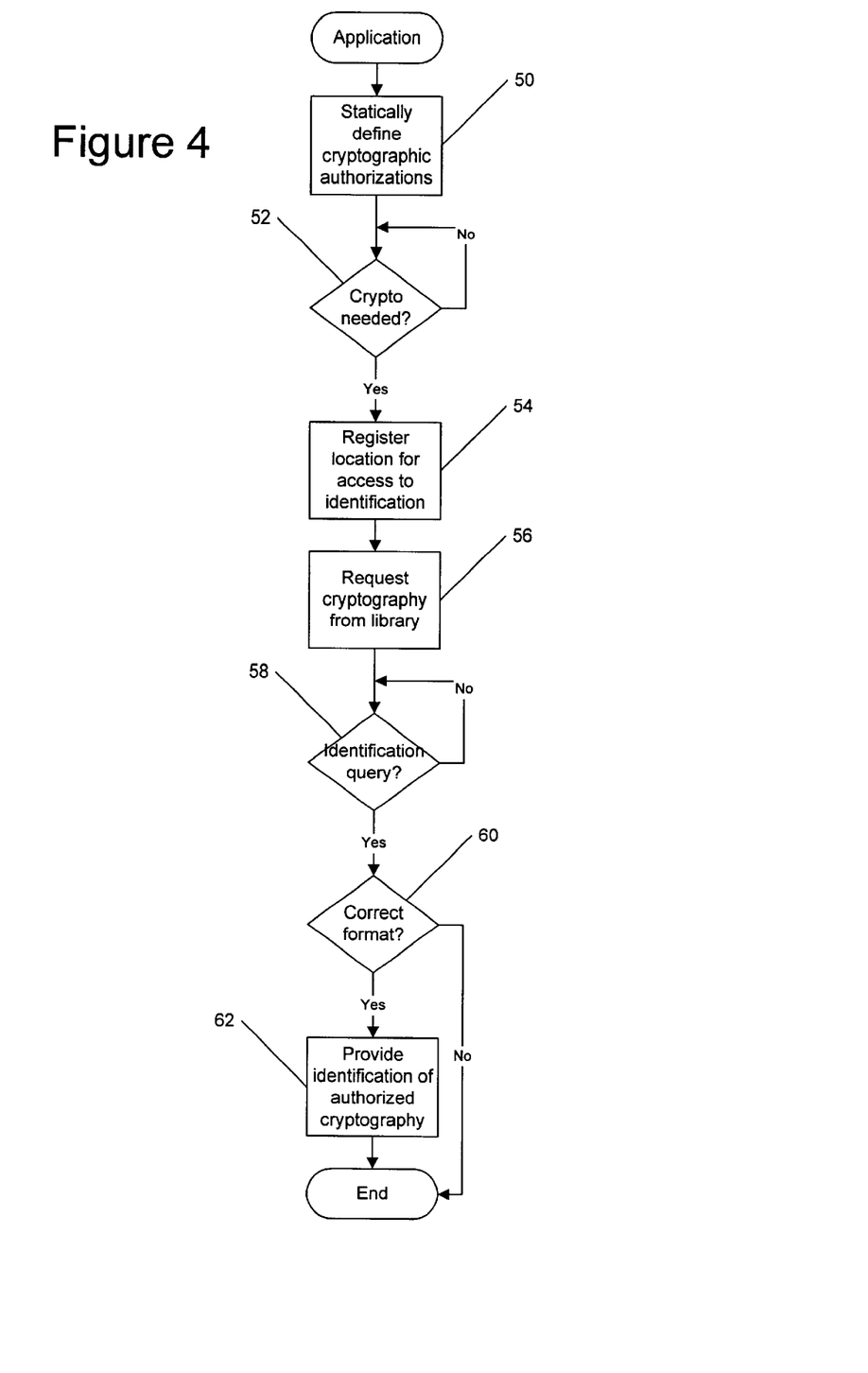
FIG. 4 is a flowchart illustrating operations of an application according to embodiments of the present invention.

Embodiments of the present invention will now be described in more detail with reference to FIGS. 4 and 5 which are flowchart illustrations of operations carried out by the application 10 and the cryptographic library 20 according to embodiments of the present invention. As seen in FIG. 4, the cryptographic functions for which the application 10 is authorized are statically defined within the application 10 so as to bind these authorizations with the application 10 (block 50). When the application 10 determines that cryptographic functions are needed (block 52), then the application 10 registers the location for access to the cryptographic level identification function 12 with the library (block 54). As described above, this may be carried out by setting a global variable which identifies the location. The application 10 then requests the use of the cryptographic library 20 (block 56) and waits for the query to identify the authorized cryptographic levels to the cryptographic library 20 (block 58). When the query is received (block 58) the application 10 may, optionally, check the format of the query to assure that it is in the correct format (block 60) and if not reject the query. As described above, if the query if provided by, for example, a void pointer pass parameter, then the application 10 may apply the predefined query format to the passed data to determine if the data passed defines a query to the application 10. If the data does define a query, then the application 10 may provide the identification of the authorized cryptographic levels to the cryptographic library utilizing the predefined identification format (block 62).

Figure 5:
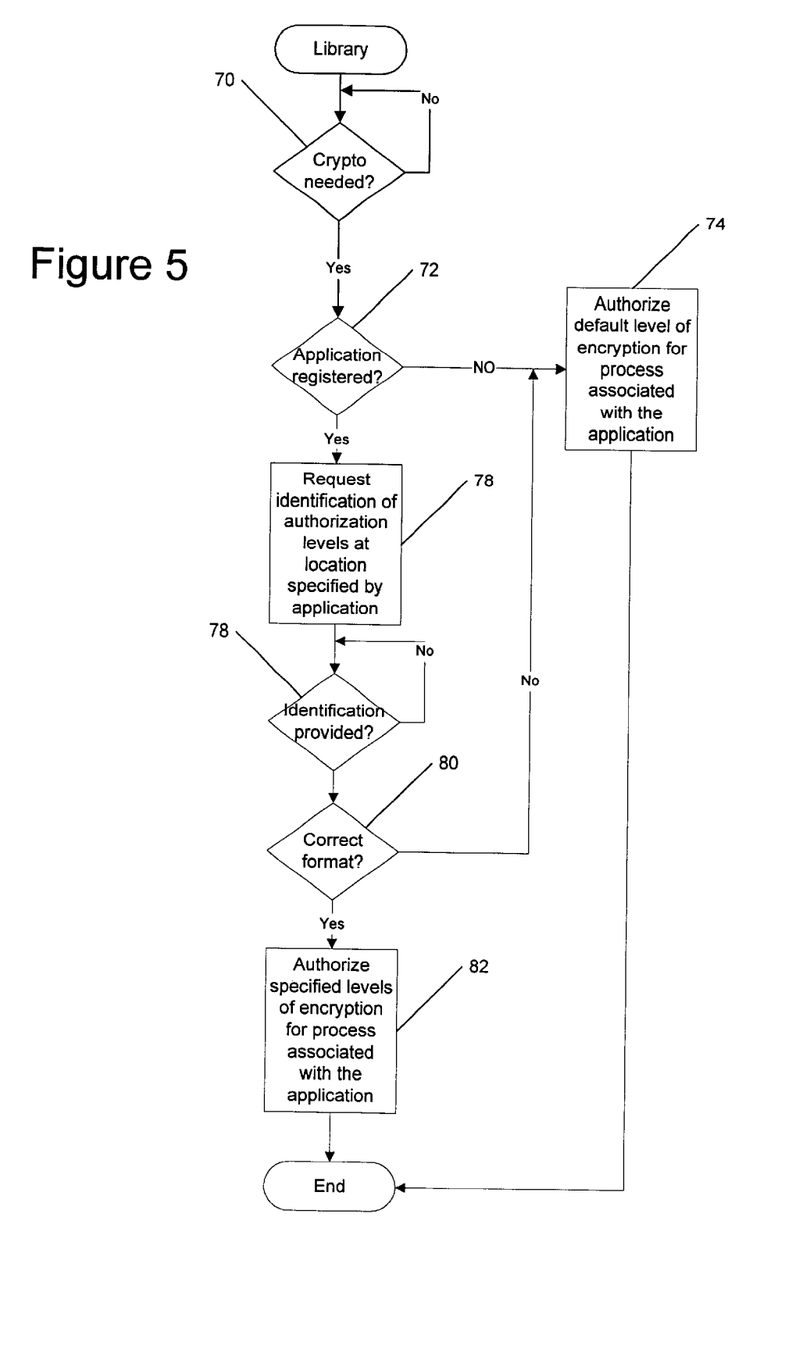
FIG. 5 is a flowchart illustrating operations of a library according to embodiments of the present invention.

The operations of the cryptographic library 20 according to other embodiments of the present invention are illustrated in FIG. 5. As is seen in FIG. 5, if the cryptographic library 20 determines that a cryptographic function is being requested (block 70), then the cryptographic library determines if the application associated with the process 30 associated with the cryptographic library 20 is registered (block 72). This determination may be made by, for example, examining the registration global variable 22 to determine if a location for accessing the application 10 has been set. If the application 10 has not been registered, then the cryptographic library 20 only authorizes the default level of encryption for requests for cryptographic services from within the process 30 of the requesting application(block 74). If, however, the application 10 of process 30 has been registered, then the cryptographic library 20 requests identification of the authorized cryptographic levels from the application 10 by sending a query in the predefined query format to the application 10 at the location specified by the registration global variable 22 (block 78). The cryptographic library 20 then waits for the response from the application 10. (block 78).

When the response to the query is received (block 78), the cryptographic library 20 may, optionally, check the format of the query to assure that it is in the correct format (block 80) and if not reject the identification and utilize the default level (block 74). As described above, if the response is provided by, for example, a void pointer pass parameter, then the cryptographic library 20 may apply the predefined identification format to the passed data to determine if the data passed defines an identification of the authorized cryptographic levels. If the data does define an identification of the authorized cryptographic levels, then the cryptographic library 20 may authorize the specified cryptographic levels for use by the cryptographic library (block 82).

As is briefly described above, according to embodiments of the present invention, the authorization of cryptographic levels may be viewed by the cryptographic library 20 as authorization for the process 30 rather than merely for application 10. Such a view of the authorization may be particularly useful where the application 10 utilizes other services for cryptographic functions. For example, if the application 10 utilizes the Lightweight Directory Access Protocol (LDAP) service to access cryptographic functions, then, because that service is within the process 30, the authorizations of the application 10 may be viewed by the cryptographic library 20 as applying to the LDAP service. Such a situation is illustrated in FIG. 6.

Figure 6:
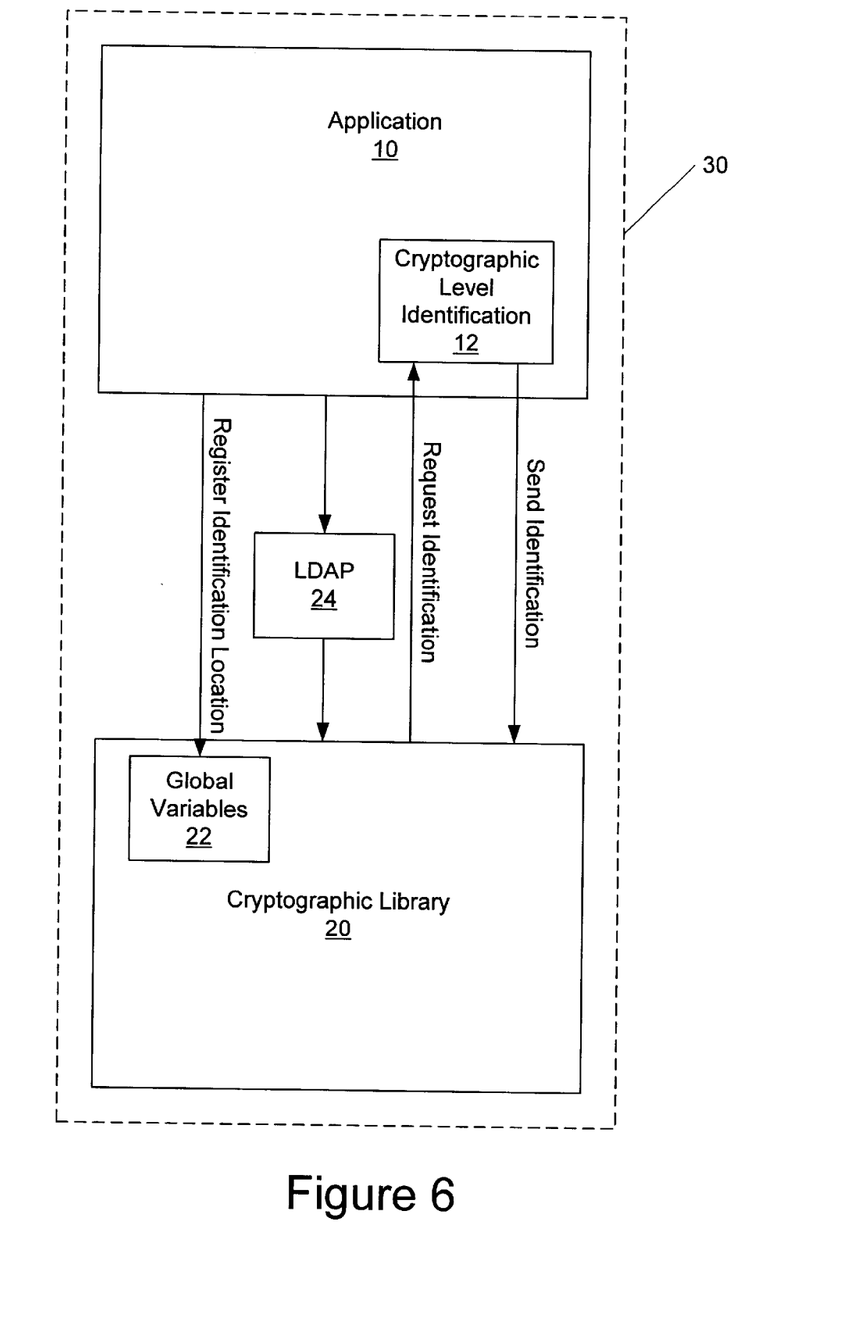
FIG. 6 is a block diagram illustrating the relationship between an application, services owned by the application and the common library according to embodiments of the present invention.

As is seen in FIG. 6, the application 10 registers with the cryptographic library 20 by setting the registration global variable 22 to the location to access the cryptographic level identification function 12. However, rather than the application 10 directly requesting cryptographic services from the cryptographic library 20, the application 10 makes a request to the LDAP service 24 which results in the LDAP service 24 requesting cryptographic services from the cryptographic library 20. The cryptographic library 20, in response to the LDAP service 24, queries the application 10 for the authorized cryptographic levels because the LDAP service 24 is within the process 30. Thus, the authorizations of the application 10 may be applied to services owned by the application 10. By viewing the authorizations of the application 10 as process wide authorizations, the need for customized services corresponding to an applications authorizations may be avoided. Thus, for example, the same LDAP services may be used for applications with differing authorizations because the application specifies the authorizations to the library.

The flowcharts and block diagrams of FIGS. 1 through 6 illustrate the architecture, functionality, and operation of a possible implementation providing access to cryptographic functions from a common source according to the present invention. In this regard, each block in the flow charts represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

Furthermore, while the present invention has been described with reference to utilizing global variables to communicate the location for the library to access the authorized functions, as will be appreciated by those of skill in the art, other methods of providing such information to the library may be utilized while still benefitting from the teachings of the present invention. For example, the location could be identified directly to the library as a pass parameter. Alternatively, the library could query the application for the location.

The present invention has been described with reference to a common library providing multiple cryptographic levels based on an authorization which is statically configured in the application. However, in addition to providing cryptographic levels the present invention may selectively provide other cryptographic functions to applications. Thus, the term "cryptographic function" is used herein to refer to cryptographic levels, such as the number of bits utilized in the encryption, as well as other cryptographic functions.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of providing cryptographic services to an application, comprising:
   incorporating in the application an indication of at least one authorized cryptographic function for the application:
   communicating the indication of at least one authorized cryptographic function for the application to a cryptographic library that supports a plurality of cryptographic functions; and
   identifying the at least one authorized cryptographic function corresponding to the indication of at least one authorized cryptographic function as a valid cryptographic function for the application;
   wherein the step of communicating the indication of at least one authorized cryptographic function comprises the steps of:
   identifying a location associated with the indication of the at least one authorized cryptographic function to the cryptographic library that supports a plurality of cryptographic functions;
   calling the application from the library at the identified location utilizing a predefined query format to request notification of cryptographic functions for which the application is authorized; and
   providing the indication of the at least one authorized cryptographic function from the application to the library utilizing a predefined format.

2. A method according to claim 1, further comprising the steps of:
   determining if the call from the library to the application is in a format other than the predefined query format; and
   rejecting the call is in a format other than the predefined query format.

3. A method according to claim 1, wherein the step of incorporating comprises the step of statically defining the indication in the application when the application is compiled.

4. A method according to claim 1, wherein a process is associated with the application, the method further comprising the step of identifying the at least one authorized cryptographic function as a valid cryptographic function for the cryptographic functions requested by all services within a scope associated with the process.

5. A method according to claim 1, wherein a process is associated with the application and wherein the step of identifying a location associated with the indication of the at least one authorized cryptographic function to a cryptographic library that supports a plurality of cryptographic functions comprises the step of setting a pointer in a globally accessible memory location associated with the process to point to the location.

6. A method according to claim 1, wherein the step of calling the application from the library is carried in a manner which obscures the contents of the call.

7. A method according to claim 6, wherein the step of calling the application from the library is carried out utilizing a void pointer data type for parameters passed to the application.

8. A method according to claim 7, wherein the step of providing is carried out utilizing a void pointer data type for parameters passed to the library.

9. A method according to claim 8, wherein the application and the library utilize the same predefined data format for sending and receiving parameters defined as a void pointer data type.

10. A method of providing a plurality of cryptographic functions utilizing a common library, the method comprising:
    receiving at the common library a request from an application for a cryptographic function;
    inspecting a predefined global variable to determine a location to query the application to ascertain authorized cryptographic functions for the application;

querying the determined location utilizing a predefined query format; and receiving an identification of authorized cryptographic functions for the application, wherein the identification is provided in a predefined identification format.

11. A method according to claim 10, wherein the identified authorized cryptographic functions are utilized for all services requesting a cryptographic functions which are within a scope of a process associated with the application.

12. A method according to claim 10, wherein the step of querying the determined location is performed in a manner which obscures the predefined query format.

13. A method according to claim 12, wherein the step of querying the determined location is performed utilizing pass parameters which have a void pointer data type.

14. A method according to claim 10, wherein the step of receiving an identification is performed in a manner which obscures the predefined identification format.

15. A method according to claim 14, wherein the step of receiving an identification is performed utilizing pass parameters which have a void pointer data type.

16. A method of providing a plurality of cryptographic functions utilizing a common library, the method comprising:

statically defining authorized cryptographic functions for an application;

defining a location associated with the application for receiving queries for identification of the authorized cryptographic functions for the application;

registering the location associated with the application with the common library;

receiving a query at the registered location, wherein the query is in a predefined query format; and providing an identification of the authorized cryptographic functions for the application in response to the query, wherein the identification is provided in a predefined identification format.

17. A method according to claim 16, wherein the identified authorized cryptographic functions are utilized for all services requesting a cryptographic function which are within a scope of a process associated with the application.

18. A method according to claim 16, wherein the step of receiving a query at the registered location is performed in a manner which obscures the predefined query format.

19. A method according to claim 18, wherein the step of receiving a query is performed utilizing pass parameters which have a void pointer data type.

20. A method according to claim 16, wherein the step of providing an identification is performed in a manner which obscures the predefined identification format.

21. A method according to claim 20, wherein the step of providing an identification is performed utilizing pass parameters which have a void pointer data type.

22. A system of providing cryptographic services to an application, comprising:

means for incorporating in the application an indication of at least one authorized cryptographic function for the application;

means for communicating the indication of at least one authorized cryptographic function for the application to a cryptographic library that supports a plurality of cryptographic functions; and means for identifying the at least one authorized cryptographic function corresponding to the indication of at least one authorized cryptographic function as a valid cryptographic function for the application;

wherein the means for communicating the indication of at least one authorized cryptographic function comprises:

means for identifying a location associated with the indication of the at least one authorized cryptographic function to the cryptographic library that supports a plurality of cryptographic functions;

means for calling the application from the library at the identified location utilizing a predefined query format to request notification of cryptographic functions for which the application is authorized; and means for providing the indication of the at least one authorized cryptographic function from the application to the library utilizing a predefined format.

23. A system according to claim 22, further comprising:

means for determining if the call from the library to the application is in a format other than the predefined query format; and means for rejecting the call is in a format other than the predefined query format.

24. A system according to claim 22, wherein the means for incorporating comprises means for statically defining the indication in the application when the application is compiled.

25. A system according to claim 22, wherein a process is associated with the application, the system further comprising means for identifying the at least one authorized cryptographic function as a valid cryptographic function for the cryptographic functions requested by all services within a scope associated with the process.

26. A system according to claim 22, wherein a process is associated with the application and wherein the means for identifying a location associated with the indication of the at least one authorized cryptographic function to a cryptographic library that supports a plurality of cryptographic functions comprises means for setting a pointer in a globally accessible memory location associated with the process to point to the location.

27. A system according to claim 22, wherein the means for calling the application from the library obscures the contents of the call.

28. A system according to claim 27, wherein the means for calling the application from the library utilizes a void pointer data type for parameters passed to the application.

29. A system according to claim 28, wherein the means for providing utilizes a void pointer data type for parameters passed to the library.

30. A system according to claim 29, wherein the application and the library utilize the same predefined data format for sending and receiving parameters defined as a void pointer data type.

31. A system for providing a plurality of cryptographic functions utilizing a common library, comprising:

means for receiving at the common library a request from an application for a cryptographic function;

means for inspecting a predefined global variable to determine a location to query the application to ascertain authorized cryptographic functions for the application;

means for querying the determined location utilizing a predefined query format; and means for receiving an identification of authorized cryptographic functions for the application, wherein the identification is provided in a predefined identification format.

32. A system according to claim 31, wherein the identified authorized cryptographic functions are utilized for all services requesting a cryptographic functions which are within a scope of a process associated with the application.

33. A system according to claim 31, wherein the means for querying the determined location obscures the predefined query format.

34. A system according to claim 33, wherein the means for querying the determined location utilizes pass parameters which have a void pointer data type.

35. A system according to claim 31, wherein the means for receiving an identification obscures the predefined identification format.

36. A system according to claim 35, wherein the means for receiving an identification utilizes pass parameters which have a void pointer data type.

37. A system for providing a plurality of cryptographic functions utilizing a common library, comprising:

means for statically defining authorized cryptographic functions for an application;

means for defining a location associated with the application for receiving queries for identification of the authorized cryptographic functions for the application;

means for registering the location associated with the application with the common library;

means for receiving a query at the registered location, wherein the query is in a predefined query format; and     means for providing an identification of the authorized cryptographic functions for the application in response to the query, wherein the identification is provided in a predefined identification format.

38. A system according to claim 37, wherein the identified authorized cryptographic functions are utilized for all services requesting a cryptographic function which are within a scope of a process associated with the application.

39. A system according to claim 37, wherein the means for receiving a query at the registered location obscures the predefined query format.

40. A system according to claim 39, wherein the means for receiving a query utilizes pass parameters which have a void pointer data type.

41. A system according to claim 37, wherein the means for providing an identification obscures the predefined identification format.

42. A system according to claim 41, wherein the means for providing an identification utilizes pass parameters which have a void pointer data type.

43. A computer program product of providing cryptographic services to an application, comprising:

a computer-readable storage medium having computer-readable program code embodied in said medium, said computer-readable program code comprising:

computer-readable program code for incorporating in the application an indication of at least one authorized cryptographic function for the application;

computer-readable program code for communicating the indication of at least one authorized cryptographic function for the application to a cryptographic library that supports a plurality of cryptographic functions; and     computer-readable program code for identifying the at least one authorized cryptographic function corresponding to the indication of at least one authorized cryptographic function as a valid cryptographic function for the application;

wherein the computer-readable program code for communicating the indication of at least one authorized cryptographic function comprises:

computer-readable program code for identifying a location associated with the indication of the at least one authorized cryptographic function to the cryptographic library that supports a plurality of cryptographic functions;

computer-readable program code for calling the application from the library at the identified location utilizing a predefined query format to request notification of cryptographic functions for which the application is authorized; and     computer-readable program code for providing the indication of the at least one authorized cryptographic function from the application to the library utilizing a redefined format.

44. A computer program product according to claim 43, further comprising:

computer-readable program code for determining if the call from the library to the application is in a format other than the predefined query format; and     computer-readable program code for rejecting the call is in a format other than the predefined query format.

45. A computer program product according to claim 43, wherein a process is associated with the application, the computer program product further comprising computer-readable program code for identifying the at least one authorized cryptographic function as a valid cryptographic function for the cryptographic functions requested by all services within a scope associated with the process.

46. A computer program product according to claim 43, wherein a process is associated with the application and wherein the computer-readable program code for identifying a location associated with the indication of the at least one authorized cryptographic function to a cryptographic library that supports a plurality of cryptographic functions comprises computer-readable program code for setting a pointer in a globally accessible memory location associated with the process to point to the location.

47. A computer program product according to claim 43, wherein the computer-readable program code for calling the application from the library obscures the contents of the call.

48. A computer program product according to claim 47, wherein the computer-readable program code for calling the application from the library utilizes a void pointer data type for parameters passed to the application.

49. A computer program product according to claim 48, wherein the computer-readable program code for providing utilizes a void pointer data type for parameters passed to the library.

50. A computer program product according to claim 49, wherein the application and the library utilize the same predefined data format for sending and receiving parameters defined as a void pointer data type.

51. A computer program product according to claim 43, wherein the computer-readable program code for incorporating comprises computer-readable program code for statically defining the indication in the application when the application is compiled.

52. A computer program product for providing a plurality of cryptographic functions utilizing a common library, comprising:

a computer-readable storage medium having computer-readable program code embodied in said medium, said computer-readable program code comprising:

computer-readable program code for receiving at the common library a request from an application for a cryptographic function;

computer-readable program code for inspecting a predefined global variable to determine a location to query the application to ascertain authorized cryptographic functions for the application;

computer-readable program code for querying the determined location utilizing a predefined query format; and computer-readable program code for receiving an identification of authorized cryptographic functions for the application, wherein the identification is provided in a predefined identification format.

53. A computer program product according to claim 52, wherein the identified authorized cryptographic functions are utilized for all services requesting a cryptographic functions which are within a scope of a process associated with the application.

54. A computer program product according to claim 52, wherein the computer-readable program code for querying the determined location obscures the predefined query format.

55. A computer program product according to claim 54, wherein the computer-readable program code for querying the determined location utilizes pass parameters which have a void pointer data type.

56. A computer program product according to claim 52, wherein the computer-readable program code for receiving an identification obscures the predefined identification format.

57. A computer program product according to claim 56, wherein the computer-readable program code for receiving, an identification utilizes pass parameters which have a void pointer data type.

58. A computer program product for providing a plurality of cryptographic functions utilizing a common library, comprising:

a computer-readable storage medium having computer-readable program code embodied in said medium, said computer-readable program code comprising:

computer-readable program code for statically defining authorized cryptographic functions for an application;

computer-readable program code for defining a location associated with the application for receiving queries for identification of the authorized cryptographic functions for the application;

computer-readable program code for registering the location associated with the application with the common library;

computer-readable program code for receiving a query at the registered location, wherein the query is in a predefined query format; and computer-readable program code for providing an identification of the authorized cryptographic functions for the application in response to the query, wherein the identification is provided in a predefined identification format.

59. A computer program product according to claim 58, wherein the identified authorized cryptographic functions are utilized for all services requesting a cryptographic function which are within a scope of a process associated with the application.

60. A computer program product according to claim 58, wherein the computer-readable program code for receiving a query at the registered location obscures the predefined query format.

61. A computer program product according to claim 60, wherein the computer-readable program code for receiving a query utilizes pass parameters which have a void pointer data type.

62. A computer program product according to claim 58, wherein the computer-readable program code for providing an identification obscures the predefined identification format.

63. A computer program product according to claim 62, wherein the computer-readable program code for providing an identification utilizes pass parameters which have a void pointer data type.

* * * * *